US009406967B2

(12) United States Patent
Fujimaki et al.

(10) Patent No.: US 9,406,967 B2
(45) Date of Patent: Aug. 2, 2016

(54) METHOD FOR PRODUCING LITHIUM SECONDARY CELL

(75) Inventors: Hisataka Fujimaki, Nisshin (JP); Katsuyuki Hojo, Toyota (JP); Tomotaka Hagino, Toyota (JP); Hiroyuki Kawaki, Toyota (JP); Shinya Kamada, Toyota (JP); Hisanao Kojima, Kariya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 140 days.

(21) Appl. No.: 13/993,135

(22) PCT Filed: Dec. 17, 2010

(86) PCT No.: PCT/JP2010/072815
§ 371 (c)(1),
(2), (4) Date: Jun. 11, 2013

(87) PCT Pub. No.: WO2012/081128
PCT Pub. Date: Jun. 21, 2012

(65) Prior Publication Data
US 2013/0255075 A1   Oct. 3, 2013

(51) Int. Cl.
*H01M 10/04* (2006.01)
*H01M 4/139* (2010.01)
*H01M 10/052* (2010.01)
*H01M 10/058* (2010.01)
*H01M 10/44* (2006.01)

(52) U.S. Cl.
CPC .............. *H01M 10/04* (2013.01); *H01M 4/139* (2013.01); *H01M 10/052* (2013.01); *H01M 10/058* (2013.01); *H01M 10/44* (2013.01); *Y02E 60/122* (2013.01); *Y02P 70/54* (2015.11); *Y02T 10/7011* (2013.01); *Y10T 29/49115* (2015.01)

(58) Field of Classification Search
CPC . H01M 4/139; H01M 10/052; H01M 10/058; H01M 10/04; H01M 10/44
See application file for complete search history.

(56) References Cited

U.S. PATENT DOCUMENTS

| 5,481,174 A | 1/1996 | Martin et al. |
|---|---|---|
| 2006/0216605 A1 | 9/2006 | Shirakata et al. |
| 2007/0072059 A1 | 3/2007 | Kitao et al. |
| 2007/0166574 A1* | 7/2007 | Nakashima et al. ............... 429/9 |
| 2011/0070497 A1* | 3/2011 | Deguchi ........................ 429/223 |

FOREIGN PATENT DOCUMENTS

| JP | 2002-75460 | 3/2002 |
|---|---|---|
| JP | 2003-234125 | 8/2003 |
| JP | 2005-235624 | 9/2005 |

(Continued)

*Primary Examiner* — Muhammad Siddiquee
(74) *Attorney, Agent, or Firm* — Finnegan, Henderson, Farabow, Garrett & Dunner, LLP

(57) ABSTRACT

Provided is a method for producing a lithium secondary cell with which the concentrated precipitation of metal impurities at the negative electrode is inhibited and short circuiting is unlikely to occur. The production method includes, assembling together the positive electrode, the separator, and the negative electrode, and then impregnating the assembly with the nonaqueous electrolyte; charging the assembly within 1 min so that a maximum achieved potential of the positive electrode becomes 3.2 V or more with respect to the redox potential of lithium; allowing the assembly to stand for 10 min or less after the charging has ended; and discharging the assembly within 1 min after the standing step.

10 Claims, 12 Drawing Sheets

(56) References Cited

FOREIGN PATENT DOCUMENTS

| | | |
|---|---|---|
| JP | 2005-243537 | 9/2005 |
| JP | 2006-269245 | 10/2006 |
| JP | 2007-18963 | 1/2007 |
| JP | 2007-26752 | 2/2007 |
| JP | 2007-42486 | 2/2007 |
| JP | 2007-234565 | 9/2007 |
| JP | 2009-238433 | 10/2009 |
| JP | 2010-138039 | 6/2010 |

* cited by examiner

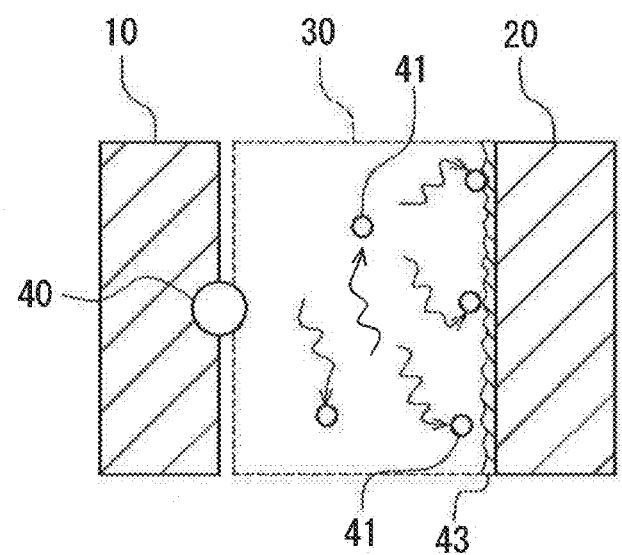

POSITIVE ELECTRODE

NEGATIVE ELECTRODE

X-RAY CT CROSS-SECTIONAL VIEW OF
SEPARATOR IN PRECIPITATION SECTION

METHOD FOR PRODUCING LITHIUM SECONDARY CELL

CROSS-REFERENCE TO RELATED APPLICATIONS

This application is a national phase application of International Application No. PCT/JP2010/072815, filed Dec. 17, 2010, the content of which is incorporated herein by reference.

TECHNICAL FIELD

The present invention relates to a method for producing a lithium secondary cell.

BACKGROUND ART

Lithium secondary cells have been actively used as high-performance secondary cells. A lithium secondary cell is provided with a positive electrode having a positive electrode active material made of a lithium-containing complex oxide, a negative electrode having a negative electrode active material capable of absorbing and releasing lithium ions, a separator interposed between the positive electrode and negative electrode, and a nonaqueous electrode impregnated in the positive electrode, negative electrode and separator. When the lithium secondary cell is produced, the positive electrode, negative electrode, and separator are assembled and impregnated with the nonaqueous electrolyte, followed by charging.

When the lithium secondary cell is produced, metal impurities such as copper or iron can be admixed from the outside. Where those metal impurities are dissolved in the nonaqueous electrolyte during charging and precipitate in a concentrated manner on the negative electrode, the precipitates can break through the separator and reach the positive electrode, thereby causing short circuiting. Accordingly, a variety of techniques have been used to prevent short circuiting caused by metal impurities.

Patent Literature 1 describes the feature of applying 100 to 10,000 times a pulse voltage with a period of 1 to 100 ms so that the closed-circuit potential of a positive electrode becomes 3.8 V to 4.2 V with respect to the lithium dissolution and precipitation potential (in other words, the redox potential) and the closed-circuit potential of the positive electrode in a state with the open cell case becomes 4.4 V to 4.5 V with respect to the lithium dissolution and precipitation potential. Patent Literature 1 indicates that the repeated application of such a low pulse voltage makes it possible to dissolve effectively the residual alkalis present on the surface of a nickel-containing positive electrode active material, and that the expansion of the cell and the increase in internal resistance can be inhibited by sealing the cell case after releasing the gases generated by the dissolution.

Patent Literature 2 describes performing the initial charging in a state in which the electric potential $E_1$ of a negative electrode is maintained within a range of 2.5 V<$E_1$<3.2 V. Patent Literature 3 describes the feature of charging at least once for 1 h, then discharging till the negative electrode potential becomes 2.0 V to 3.35 V with respect to the lithium redox potential, and allowing to stand for 3 min or more in this state. Patent Literature 4 describes the feature of mixing an additive that can be reduced at a negative electrode at an electric potential equal to or higher than 1.5 V and charging only a positive electrode in the initial charging. Patent Literature 5 describes the technique for efficiently removing metal particles when purifying a carbon material that can be used as a negative electrode active material. Patent Literature 6 describes the feature of inhibiting the internal short circuit by setting the admixed amount of a transition metal element other than the transition metal element constituting a positive electrode active material to a predetermined value or below. Patent Literature 7 describes the feature of charging to 0.01% to 0.1% of the cell capacity during the initial charging and then providing a standing time of 1 h to 48 h.

CITATION LIST

Patent Literature

Patent Literature 1: Japanese Patent Application Publication No. 2005-235624
Patent Literature 2: Japanese Patent Application Publication No. 2003-234125
Patent Literature 3: Japanese Patent Application Publication No. 2006-269245
Patent Literature 4: Japanese Patent Application Publication No. 2007-026752
Patent Literature 5: Japanese Patent Application Publication No. 2010-138039
Patent Literature 6: Japanese Patent Application Publication No. 2002-075460
Patent Literature 7: Japanese Patent Application Publication No. 2005-243537

SUMMARY OF INVENTION

With the technique described in Patent Literature 1 by which the assembly is repeatedly micro-charged, the residual alkalis are expected to be removed from the surface of the nickel-containing positive electrode active material. However, with such repeated micro-charging, the electric potential of the negative electrode remains in the decreased state. As a result, metal impurities can precipitate in a concentrated manner on the negative electrode and the precipitates can grow toward the positive electrode side.

With the discharging technique allowing to stand after long-term charging (see Patent Literature 3), it is expected that the negative electrode potential will be increased by discharging and that the dissolved metal ions will diffuse during standing. Therefore, when a cell is allowed to stand, the concentrated precipitation on the negative electrode can be expected to be inhibited. However, the precipitation on the negative electrode can occur and the precipitates can grow during the long-term charging prior to the above-mentioned discharge.

With the technique of allowing the cell to stand for a long time after micro-charging (see Patent Literature 7), the negative electrode potential also decreases during the charging and the cell is allowed to stand in this state for a long time. Therefore, the precipitation can occur on the negative electrode and the precipitates can grow.

It is an object of the present invention to provide a method for producing a lithium secondary cell with which the concentrated precipitation of metal impurities on the negative electrode is inhibited and short circuiting is unlikely to occur.

The present invention provides a method for producing a lithium secondary cell provided with a positive electrode having a positive electrode active material made of a lithium-containing complex oxide, a negative electrode having a negative electrode active material capable of absorbing and releasing lithium ions, a separator interposed between the positive electrode and the negative electrode, and a nonaqueous electrolyte impregnated in the positive electrode, the negative electrode, and the separator. The production method includes, after the positive electrode, the separator, and the negative electrode have been assembled and impregnated with the nonaqueous electrolyte, charging the assembly within 1 min so that a maximum achieved potential of the positive electrode becomes 3.2 V or more with respect to the redox potential of lithium, allowing the assembly to stand for 10 min or less after the charging has ended, and discharging the assembly within 1 min after the standing step.

With such a method, the increase in electric potential of the positive electrode in the charging step results in the dissolution of metal impurities on the positive electrode and formation of metal ions which move to the negative electrode side. The diffusion rate of the metal ions is comparatively low, but where the charging is maintained for a long time, the metal ions can reach the negative electrode and precipitate in a concentrated manner on the negative electrode. However, with the aforementioned method, the charging time is within 1 min, that is, relatively short. In addition, the discharging is performed after the assembly has been allowed to stand for a short time after the charging. Therefore, the diffusion of the metal ions is enhanced and the concentrated precipitation on the negative electrode is inhibited.

In a preferred aspect of the method disclosed herein, the method further includes allowing the assembly to stand after the discharging has ended. Further, the charging step, the standing step after the charging, the discharging step, and the standing step after the discharging are repeated one, two or more times. As a result, the dissolution of metal impurities from the positive electrode can be repeatedly enhanced and the precipitation of the metal impurities at the negative electrode can be repeatedly mitigated. Therefore, the concentrated precipitation on the negative electrode can be effectively inhibited, while sufficiently dissolving the metal impurities.

In another preferred aspect of the method disclosed herein, the positive electrode active material is made of a lithium-containing complex oxide including at least manganese, cobalt, and nickel. The charging time is longer than the discharging time. Where charging and discharging are repeated in the case of a lithium-containing complex oxide including manganese, cobalt, and nickel, there is a strong tendency to the continuous decrease in the positive electrode potential. However, where the charging time is made longer than the discharging time, the decrease in the positive electrode potential can be inhibited and the dissolution of metal impurities can be continued till the impurities are sufficiently dissolved.

In another preferred aspect, the charging step, the standing step after the charging, the discharging step, and the standing step after the discharging are repeated ten or more times.

In another preferred aspect, an electric current equal to or higher than 1 C is supplied during the charging. In another preferred aspect, an electric current equal to or higher than 1 C is supplied during the discharging. By supplying a large electric current during short-time charging or discharging, it is possible to adjust the electric potentials of the positive electrode and negative electrode within a short period of time. Therefore, metal ions can be sufficiently diffused, while preventing the concentrated precipitation on the negative electrode.

In another preferred aspect, the charging is performed for 1 to 10 sec in the charging step. In another preferred aspect, the discharging is performed for 1 to 10 sec in the discharging step.

In another preferred aspect, a maximum achieved potential of the negative electrode is set to be 3.2 V or less with respect to the redox potential of lithium in the discharging step. As a result, the metal impurities precipitated on the negative electrode are prevented from re-dissolving from the negative electrode.

In another preferred aspect, the method further includes allowing the assembly to stand for 30 min or more after all of the steps have ended; and charging the assembly in excess of 1 min. By allowing the assembly to stand for 30 min or more, it is possible to enhance the diffusion of metal ions. The main charging is performed after the metal ions have sufficiently diffused.

BRIEF DESCRIPTION OF DRAWINGS

FIG. 2C illustrates schematically the state in which the dissolved metal ions dispersedly precipitate on the negative electrode.

DESCRIPTION OF EMBODIMENTS

The preferred embodiments of the present invention are explained below. The matters which are necessary for carrying out the present invention, but are other than the matters particularly described in the present description, are considered as designed matters that can be achieved by a person skilled in the art on the basis of the related art. The present invention can be carried out on the basis of the contents disclosed in the present description and general technical knowledge in the pertinent field.

The embodiment explained hereinbelow relates to a method for producing a lithium secondary cell comprising a positive electrode having a positive electrode active material made of a lithium-containing complex oxide, a negative electrode having a negative electrode active material capable of absorbing and releasing lithium ions, a separator interposed between the positive electrode and the negative electrode, and a nonaqueous electrolyte impregnated in the positive electrode, the negative electrode, and the separator. The "lithium secondary cell" as referred to in the present description, is a secondary cell which uses lithium ions as electrolyte ions and in which charging and discharging is performed by the movement of the lithium ions between the positive electrode and negative electrode. A secondary cell that is generally referred to as a lithium ion secondary cell is a representative example of the lithium secondary cell in the present description.

Figure 1A:
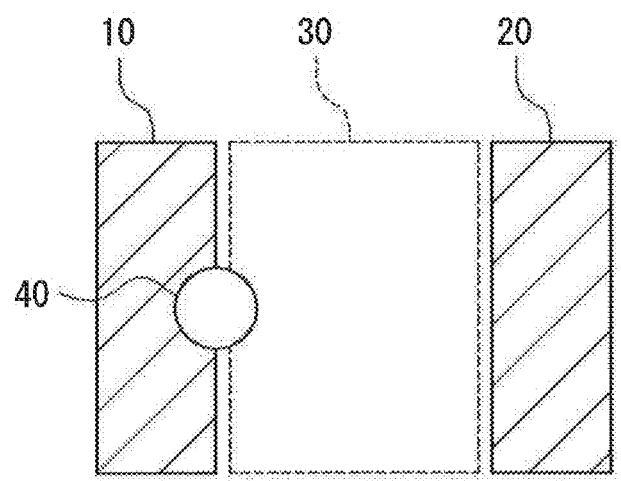
FIG. 1A illustrates schematically the state in which a metal impurity is included in the positive electrode of a lithium secondary cell.
Figure 1B:
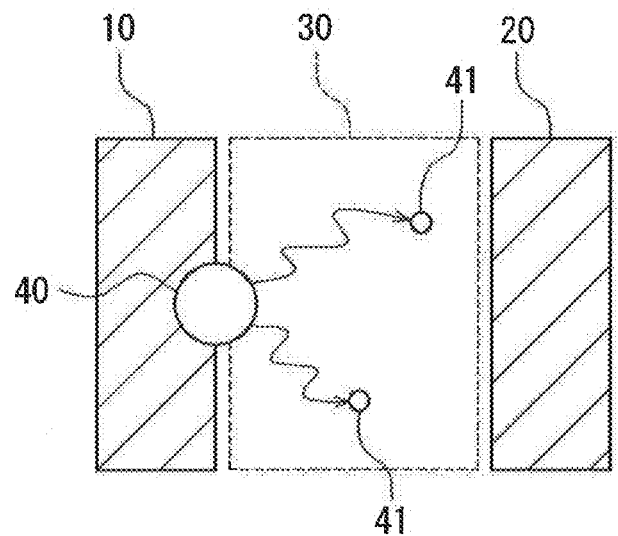
FIG. 1B illustrates schematically the state in which the metal impurity of the positive electrode is dissolved.
Figure 1C:
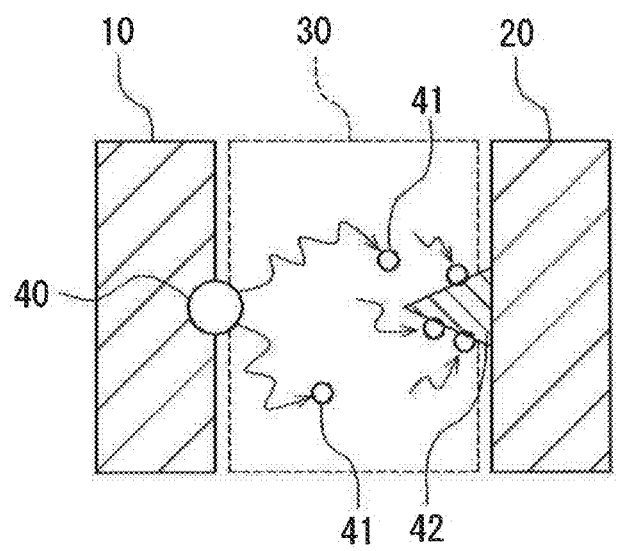
FIG. 1C illustrates schematically the state in which the dissolved metal ions precipitate in a concentrated manner on a negative electrode.

Such a lithium secondary cell is produced by assembling together the positive electrode, separator, and negative electrode, accommodating the assembly together with the nonaqueous electrolyte in a cell case, and sealing the cell case. When the lithium secondary cell is manufactured, metal impurities such as copper and iron are sometimes included in the positive electrode active material of the positive electrode. FIG. 1A shows schematically the state in which a metal impurity 40 is included in a positive electrode 10. During charging, the electric potential of the positive electrode 10 becomes higher than the dissolution potential of the metal impurity 40. Therefore, as shown in FIG. 1B, the metal impurity 40 is dissolved, metal ions 41 are generated, and the metal ions 41 move inside a separator 30 toward a negative electrode 20. Where the charging is continued, the metal ions 41 thereafter reach the negative electrode 20 and precipitate on the negative electrode 20. As the charging advances, a precipitate 42 on the negative electrode 20 gradually grows toward the positive electrode 10 side, as shown in FIG. 1C.

In the present embodiment, the below-described preliminary charging and discharging are performed prior to charging the lithium secondary cell to a predetermined capacity (referred to hereinbelow as "main charging") in order to inhibit the above-mentioned growth of the precipitate 42. Thus, first, the charging is performed within 1 min (referred to hereinbelow as "micro-charging"), the cell is allowed to stand over a predetermined time equal to or less than 10 min after the micro-charging is ended, and the discharging is performed within 1 min (referred to hereinbelow as "micro-discharging") after the standing step.

Figure 2A:
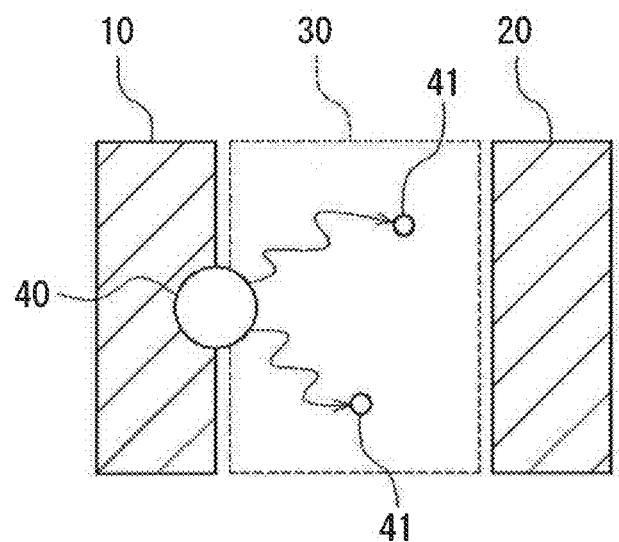
FIG. 2A illustrates schematically the state in which the metal impurity of the positive electrode dissolves.
Figure 2B:
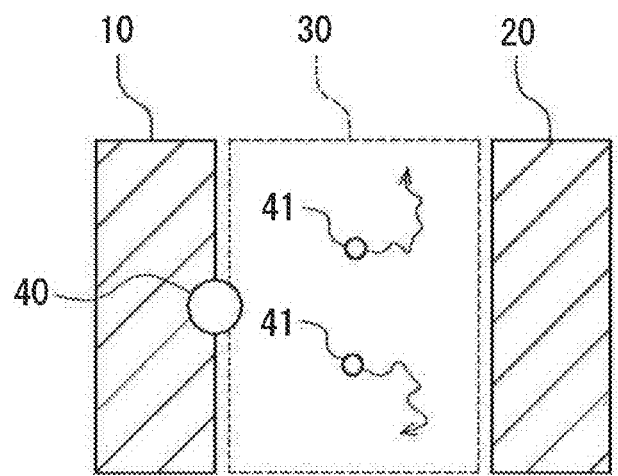
FIG. 2B illustrates schematically the state in which the dissolved metal ions diffuse.

Due to the micro-charging, the electric potential of the positive electrode 10 temporarily becomes higher than the dissolution potential of the metal impurity 40. Therefore, as shown in FIG. 2A, the metal impurity 40 dissolves, metal ions 41 are generated, and the metal ions 41 move inside the separator 30 toward the negative electrode 20. However, the micro-charging continues only for a very short time, and the cell is thereafter allowed to stand. The micro-discharging is then performed after the standing step. As a result, as shown in FIG. 2B, the movement of the metal ions 41 toward the negative electrode 20 is relaxed, and the metal ions 41 diffuse sufficiently inside the separator 30. The metal ions 41 are thus prevented from precipitating in a concentrated manner in the predetermined location of the negative electrode 20.

In the present embodiment, the cell is further allowed to stand after the micro-discharging. The steps of micro-charging, standing, micro-discharging, and standing are thereafter repeated one, two or more times. As a result, the metal ions 41 reach the negative electrode 20 after diffusing. As shown in FIG. 2C, the metal ions 41 precipitate over a large area of the negative electrode 20. Therefore, the precipitates 43 of the metal ions 41 are formed relatively thinly over a wide range, and the growth of the precipitates 43 toward the positive electrode 10 side is inhibited. The number of cycles of micro-charging, standing, micro-discharging, and standing is not particularly limited, but a larger number of cycles can be expected to result in a more effective inhibition of concentrated precipitation of the metal ions 41. The number of cycles may be, for example, 5 of more, or 10 or more. Meanwhile, where the number of cycles becomes too large, the cost and time of preliminary charging and discharging increase, and the production time of the lithium secondary cell tends to increase. The number of cycles may be, for example, 30 or less, or 20 or less.

Figure 3:
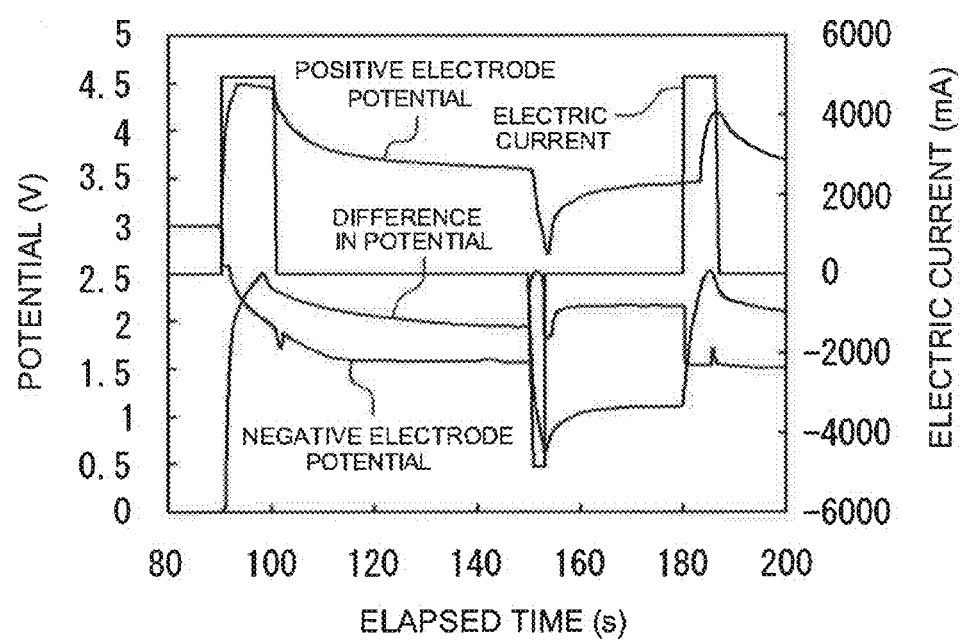
FIG. 3 illustrates an example of preliminary charging and discharging.

FIG. 3 illustrates an example of preliminary charging and discharging and shows how the supplied current, positive electrode potential, negative electrode potential, and the difference in potential between the positive electrode and the negative electrode (referred to hereinbelow as "difference in potential") vary with time.

The micro-charging time can be set as appropriate. Where the micro-charging time is too short, a sufficient dissolution of metal impurities is unlikely to occur. Where the micro-charging time is too long, the metal ions tend to precipitate easily in a concentrated manner on the negative electrode. The micro-charging time is not particularly limited. An example of the preferred time is 1 sec to 10 sec. The micro-charging time in the cycles may be the same or different. In the example shown in FIG. 3, the micro-charging time of the first cycle is 10 sec, and the micro-charging time of the second cycle is 4 sec.

In the standing step after the micro-charging, the potentials of the positive electrode and negative electrode are essentially maintained, although a certain self-discharge occurs. Where the standing time is too long, the metal ions tend to precipitate easily in a concentrated manner on the negative electrode. Accordingly, in the present embodiment, the standing time is within 10 min. The staining time is preferably within 5 min, more preferably within 3 min, and even more preferably within 1 min. For example, the standing time may be 20 sec to 40 sec. The standing time of the cycles may be the same or different. In the example shown in FIG. 3, the standing time after the micro-charging is about 44 sec.

The micro-discharging time also can be set as appropriate. Where the micro-discharging time is too short, the negative electrode potential cannot increase sufficiently and the precipitation of metal ions cannot be effectively inhibited. Where the micro-discharging time is too long, the negative electrode potential rises too much and extra time and energy are necessary to raise the positive electrode potential during subsequent charging. The micro-discharging time is not particularly limited, and the preferred time can be, for example, 1 sec to 10 sec. The micro-discharging time of the cycles may be the same or different. In the example shown in FIG. 3, the micro-discharging time is 2 sec.

Since the negative electrode potential is relatively high after the micro-discharging, the metal ions are unlikely to precipitate. The precipitation of the metal ions is unlikely to occur even if the standing time after the micro-discharging is long. However, where the standing time after the micro-discharging is too long, the time to the subsequent micro-charging becomes too long and a long time is necessary to end the entire preliminary charging and discharging. Accordingly, the standing time is preferably within 10 min and may be within 5 min. Alternatively, the standing time may be within 3 min or within 1 min. For example, the standing time is 20 sec to 40 sec. The standing time of the cycles may be the same or different. In the example, shown in FIG. 3, the standing time after the micro-discharging is about 30 sec.

The micro-charging time may be equal to the micro-discharging time or one of them may be longer than the other. However, where the charging time is longer than the discharging time, the effect of self-discharge is included in the total discharge. Therefore, the positive electrode potential can decrease continuously. In particular, where the so-called ternary lithium-transition metal oxide including manganese (Mn), cobalt (Co), and nickel (Ni) is used as the positive electrode active material, the self-discharge amount is large and therefore there is a strong tendency to the continuous decrease in positive electrode potential. For this reason, it is preferred that the micro-charging time be longer than the micro-discharging time. By setting the micro-charging time longer than the micro-discharging time, it is possible to inhibit the decrease in positive electrode potential and maintain the dissolution till the metal impurities diffuse sufficiently.

In the present embodiment, a pulsed voltage is applied between the positive electrode 10 and the negative electrode 20 so as to obtain a pulse-shaped current waveform during the micro-charging and micro-discharging. From the standpoint of enhancing the dissolution of metal impurities, it is preferred that the electric current value during the micro-charging be comparatively high. From the standpoint of sufficiently mitigating the precipitation of metal ions, it is preferred that the electric current value during the micro-discharging be comparatively high. This is because the positive electrode potential can be rapidly decreased and the negative electrode potential can be rapidly increased. The electric current values during the micro-charging and micro-discharging are not particularly limited, but are preferably equal to or greater than 1 C, more preferably equal to or greater than 2 C. In the present embodiment, the electric current values during the micro-charging and micro-discharging are equal to or greater than 1 C and equal to or greater than 4 A. The electric current value during the micro-charging may be equal to or different from that during the micro-discharging. Further, the micro-charging is performed a plurality of cycles. The electric current values in the cycles may be the same or different. The same is true for the micro-discharging. In the example shown in FIG. 3, the electric current values during the micro-charging and micro-discharging are about 5 A. In FIG. 3, the electric current during the charging is presented as a plus current, and the electric current during the discharging is presented as a minus current.

Figure 4:
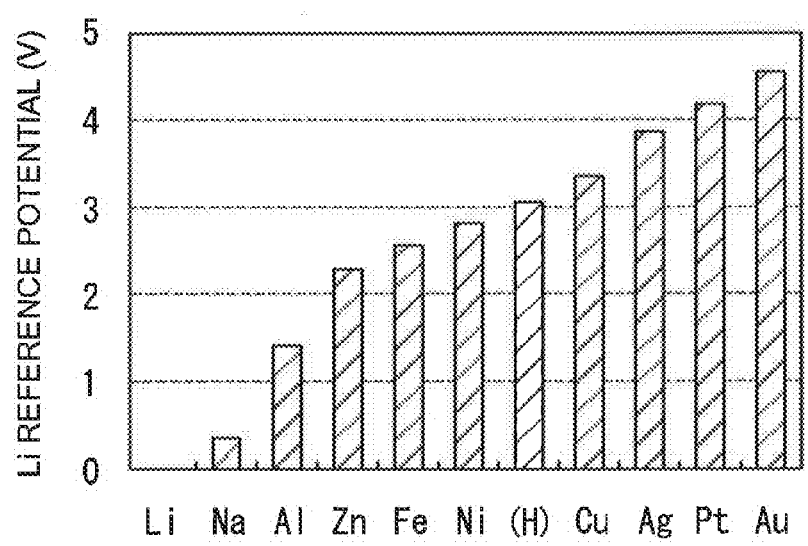
FIG. 4 is a graph illustrating the redox potential of various metal elements with respect to the lithium redox potential.

The maximum achieved potential of the positive electrode during the micro-charging and the maximum achieved potential of the negative electrode during the micro-discharging can be set, as appropriate, for example, according to the type of metal impurities that can be admixed or the type of the metal impurity with a high probability of admixing. FIG. 4 is a graph showing the redox potentials of various metal elements with respect to the lithium redox potential. The redox potential is synonymous to a dissolution-precipitation potential. Among the metal impurities with a high probability of admixing, copper (Cu) has the highest redox potential, and the redox potential is known to be about 3.2 V. In the present embodiment, not only iron (Fe), but also copper is selected as the target metal impurity, and the maximum achieved potential of the positive electrode during the micro-charging is set to 3.2 V or more and the maximum achieved potential of the negative electrode during the micro-discharging is set to 3.2 V or less with the object of enhancing the dissolution of iron and copper from the positive electrode and inhibit the concentrated precipitation thereof on the negative electrode. In the example shown in FIG. 3, the maximum achieved potential of the positive electrode in the first micro-charging cycle is about 4.5 V, the maximum achieved potential of the negative electrode during the micro-discharging is about 2.5 V, and the maximum achieved potential of the positive electrode in the second micro-charging cycle is about 4.1 V.

After the above-described preliminary charging and discharging have ended, the cell is allowed to stand for example, for a period of time equal to or longer than 30 min, and the main charging is thereafter performed. By contrast with the micro-charging, the main charging is performed for a period of time in excess of 1 min. In the main charging, the lithium secondary cell is charged to a predetermined cell capacity.

In the above-described production method according to the present embodiment, the micro-charging is initially performed to raise the positive electrode potential to above the dissolution potential of impurities dissolve (ionize) the impurities from the positive electrode. Then, the dissolved metal ions are diffused in the nonaqueous electrolyte by allowing the cell to stand. The potential gradient between the positive electrode and the negative electrode is then relaxed by the micro-discharging and the movement of the metal ions to the negative electrode is inhibited. The cell is then allowed to stand for a certain time to allow the metal ions to diffuse, and the micro-charging is thereafter performed again and the positive electrode potential is increased to dissolve the impurities again from the positive electrode. Similar steps are thereafter repeated, thereby sufficiently dissolving the impurities present on the positive electrode and causing sufficient diffusion of the dissolved metal ions. As a result, the impurities are dispersed and precipitated on the negative electrode.

Figure 5:
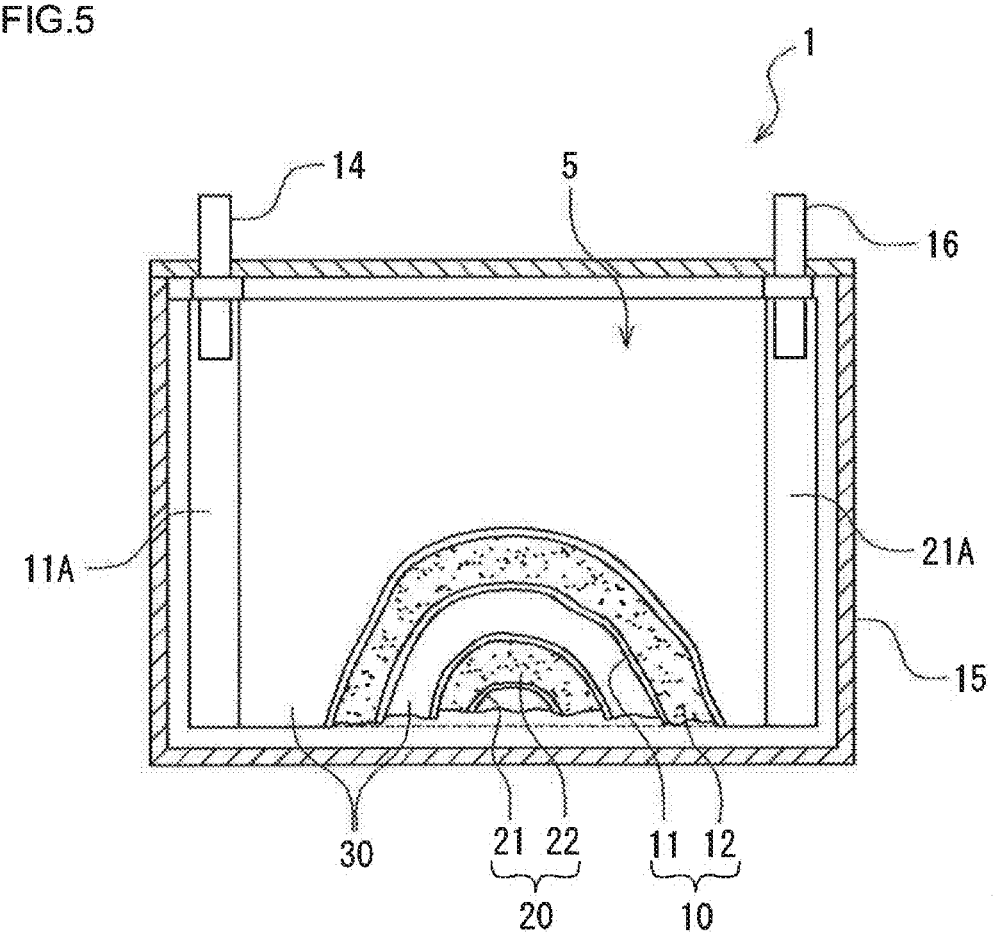
FIG. 5 is a partially cut-out cross-sectional view of the lithium ion secondary cell according to an embodiment.

The form, capacity, and applications of the lithium secondary cell produced by the production method of the present embodiment are not particularly limited. A lithium ion secondary cell 1 is explained below with reference to FIG. 5 as an example of the lithium secondary cell.

The lithium ion secondary cell 1 is provided with a flat angular cell case 15. An electrode body 5 is accommodated in the cell case 15. The electrode body 5 is constituted by a positive electrode 10, a negative electrode 20, and two separators 30 in the form of sheets. The positive electrode 10, negative electrode 20, and two separators 30 are laminated and the laminate is wound. The wound electrode body 5 is pressed from the outside to obtain a flat shape matching the shape of the cell case 15.

The positive electrode 10 has a positive electrode collector 11 and a positive electrode active material layer 12 that includes a positive electrode active material and is provided on the positive electrode collector 11. The positive electrode active material layer 12 is formed on each surface of the positive electrode collector 11. The negative electrode 20 has a negative electrode collector 21 and a negative electrode active material layer 22 that includes a negative electrode active material and is provided on the negative electrode collector 21. The negative electrode active material layer 22 is formed on each surface of the negative electrode collector 21. The positive electrode active material layer 12 is not formed at one end section of the positive electrode collector 11 in the longitudinal direction thereof. A positive electrode terminal 14 is connected to an exposed portion 11A of the positive electrode collector 11. Likewise, the negative electrode active material layer 22 is not formed at one end section of the negative electrode collector 21 in the longitudinal direction thereof. A negative electrode terminal 16 is connected to an exposed portion 21A of the negative electrode collector 21.

The electrode body 5 with the terminals 14, 16 connected thereto is inserted into the cell case 15, a nonaqueous electrolyte is supplied into the case, and the cell case 15 is sealed to configure the lithium ion secondary cell 1.

The nonaqueous electrolyte includes a lithium salt as a support salt in an organic solvent (nonaqueous solvent). A nonaqueous electrolyte that is in a liquid state at normal temperature (that is, electrolytic solution) can be advantageously used. A well-known lithium salt that has been used as a support salt of nonaqueous electrolytes for lithium ion secondary cells can be selected, as appropriate, and used as the lithium salt. Examples of such lithium salts include $LiPF_6$, $LiBF_4$, $LiClO_4$, $LiAsF_6$, $Li(CF_3SO_2)_2N$, and $LiCF_3SO_3$. The lithium salts can be used individually or in combinations of two or more thereof. Among them, $LiPF_6$ is particularly preferred.

An organic solvent that is suitable for a typical lithium ion secondary cell can be selected, as appropriate, and used as the abovementioned nonaqueous electrolyte. Examples of especially preferred nonaqueous solvents include carbonates such as ethylene carbonate (EC), dimethyl carbonate (DMC), ethyl methyl carbonate (EMC), diethyl carbonate (DEC), and propylene carbonate (PC). Those organic solvents can be used individually or in combinations of two or more thereof.

A conductive material made of a metal with good electric conductivity is preferably used for the positive electrode collector 11. For example, aluminum or an alloy including aluminum as the main component can be used. The positive electrode active material layer 12 can include, as necessary, a conductive additive and a binder in addition to the positive electrode active material. For example, a carbon material such as carbon black (for example, acetylene black) and a graphite powder can be advantageously used as the conductive additive. Polyvinylidene fluoride (PVDF), carboxymethyl cellulose (CMC), and styrene butadiene rubber (SBR) can be used as the binder.

A material capable of absorbing and releasing lithium is used as the positive electrode active material, and one, two or more materials (for example, oxides with a layered structure or oxides with a spinel structure) that have been conventionally used in lithium ion secondary cells can be used, without any particular limitation, as the positive electrode material. Examples of suitable materials include lithium-containing complex oxides such as lithium nickel complex oxides, lithium cobalt complex oxides, lithium manganese complex oxides, and lithium magnesium complex oxides.

The lithium nickel complex oxide, as referred to herein means also to include oxides including at least one metal element other than lithium and nickel (that is, a transition metal element and/or typical metal element other than Li and Ni) as a structural metal element at a ratio (calculated as an atomic number) about same as or lower than that of nickel (typically lower than that of nickel), in addition to oxides having lithium (Li) and nickel (Ni) as the structural metal elements. The metal elements other than Li and Ni can be of one, two or more species selected form the group including cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce). Lithium cobalt complex oxides, lithium manganese complex oxides, and lithium magnesium complex oxides have a similar meaning.

An olivine-type lithium phosphate represented by the general formula $LiMPO_4$ (M is at least one or more elements from among Co, Ni, Mn, and Fe; for example, $LiFePO_4$ and $LiMnPO_4$) may be used as the positive electrode active material. The so-called ternary lithium-transition metal oxide including at least manganese, cobalt, and nickel may be also used. For example, a lithium-transition metal oxide including manganese, cobalt, and nickel at approximately the same atomic ratio ($LiNi_{1/3}Mn_{1/3}Co_{1/3}O_2$) may be used.

A conductive member made of a metal with good electric conductivity can be advantageously used for the negative electrode collector 21. For example, copper or an alloy including copper as the main component can be used. In addition to the negative electrode active material, the negative electrode active material layer 22 can include, as necessary, a conductive additive and a binder similar to those of the positive electrode active material layer 12. One, two or more substances that have been used in lithium ion secondary cells can be used without any particular limitation as the negative electrode material. For example, carbon particles are an advantageous negative electrode active material. A particulate carbon material including a graphite structure (layered structure) in at least part thereof can be advantageously used. The so-called graphitic materials (graphite), non-graphitizable carbonaceous materials (hard carbon), easily graphitizable carbonaceous materials (soft carbon), and all carbon materials having a combination structure thereof can be used advantageously.

As the separator 30, for example, a porous film made of a polyolefin resin such as polyethylene (PE) and polypropylene (PP) can be advantageously used. Uniaxially or biaxially stretched porous resin films can be advantageously used as the porous film. Among them a porous resin film uniaxially stretched in the longitudinal direction is especially preferred because it has a small thermal shrinkage in the width direction, while ensuring the appropriate strength.

Figure 6:
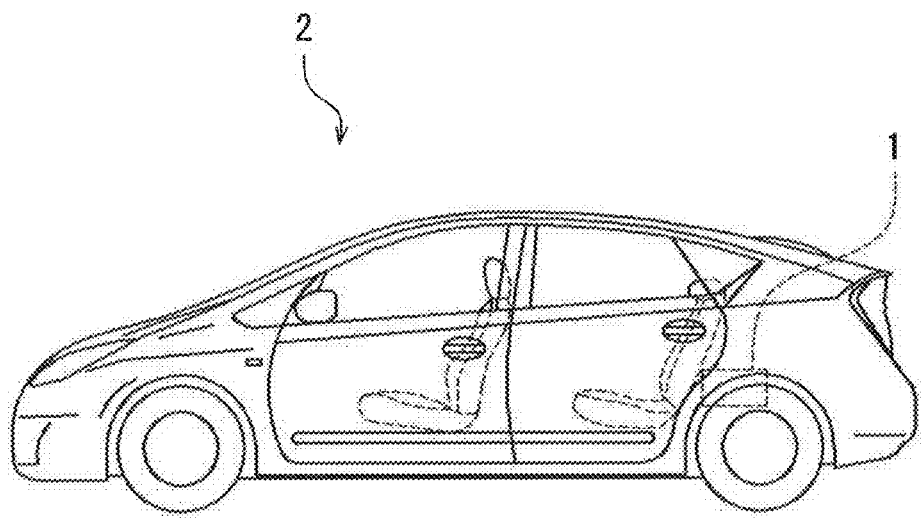
FIG. 6 is a side view of a vehicle equipped with the lithium ion secondary cell according to the embodiment.

The applications of the lithium secondary cell according to the present embodiment are not particularly limited. As mentioned hereinabove, with the lithium secondary cell according to the present embodiment, the internal short circuit can be effectively prevented. Therefore, high reliability and excellent input/output performance can be obtained. Therefore, the lithium secondary cell according to the present embodiment can be advantageously used as a power source for a motor (electric motor) installed on a vehicle, such as an automobile. For example, as shown in FIG. 6, the lithium ion secondary cell 1 can be advantageously used as a power source for a vehicular drive motor (electric motor) installed on a vehicle 2 such as an automobile. The type of the vehicle 2 is not particularly limited, but this vehicle is typically a hybrid automobile, an electric automobile, or a fuel cell automobile. Such a lithium ion secondary cell 1 may be used individually or in the form of a battery pack in which a plurality of such cells is connected in series and/or in parallel.

An example of the present invention is explained below. However, the explanation below is not intended to restrict the present invention to this specific example.

A lithium ion secondary cell was produced by laminating a positive electrode, a separator, and a negative electrode, winding the laminate, accommodating the wound body in a cell case, and impregnating with a nonaqueous electrolyte. A ternary lithium-transition metal oxide ($LiNi_{1/3}Mn_{1/3}Co_{1/3}O_2$) was used for the active material of the positive electrode active material layer, acetylene black (AB) was used for the conductive additive, and polyvinylidene fluoride (PVDF) was used for the binder. The dimensions of the positive electrode were 85 mm×5 m. The separator was a PE-PP-PPE three-layer film and the thickness thereof was 20 μm. Graphite was used for the negative electrode active material. The dimensions of the negative electrode were 90 mm×5 m. The nonaqueous electrolyte included $LiPF_6$ as a lithium salt, and ethylene carbonate (EC), dimethyl carbonate (DMC), and ethyl methyl carbonate (EMC) as nonaqueous solvents.

Figure 7:
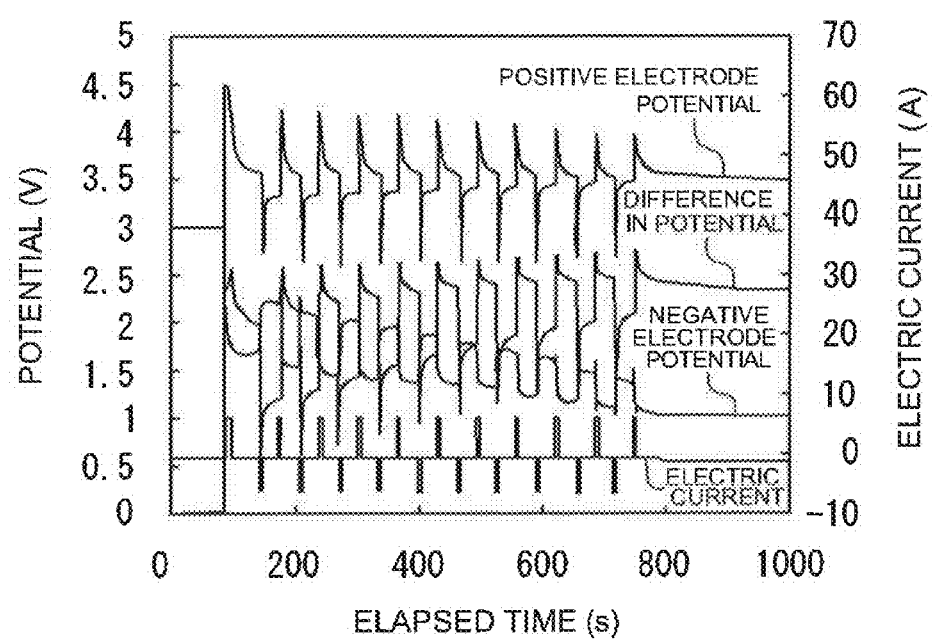
FIG. 7 illustrates how the electric current, positive electrode potential, negative electrode potential, and difference in potential between the positive electrode and negative electrode vary with time in the example.
Figure 8:
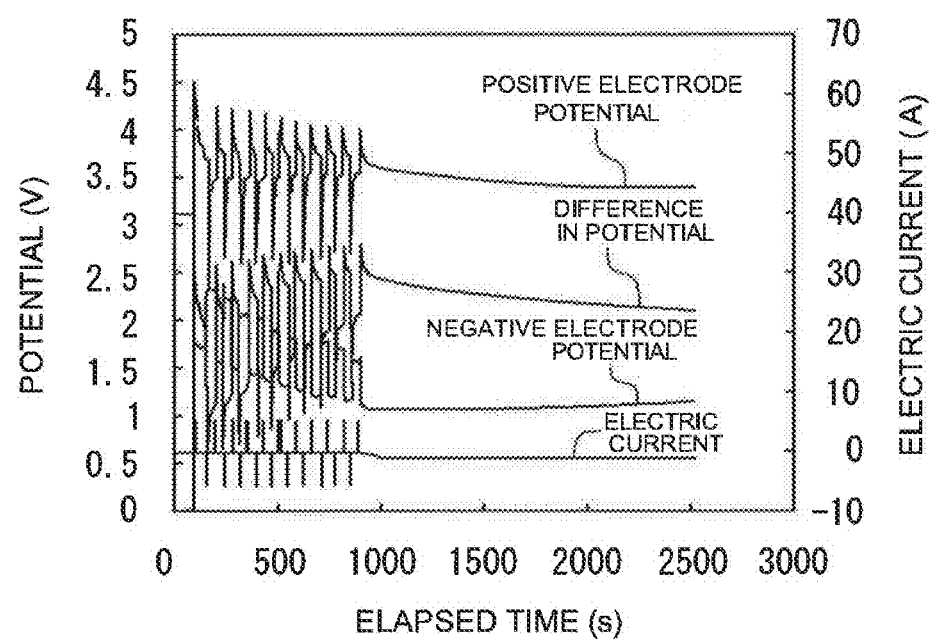
FIG. 8 illustrates how the electric current, positive electrode potential, negative electrode potential, and difference in potential between the positive electrode and negative electrode vary with time in the example.

A copper particle with a diameter of 100 μm and a thickness of 4 μm was attached as a metal impurity to the positive electrode. The preliminary charging and discharging, such as illustrated by FIGS. 7 and 8, were performed in 20 h after the impregnation with the nonaqueous electrolyte. FIGS. 7 and 8 are graphs illustrating how the supplied current, positive electrode potential, negative electrode potential, and difference in potential between the positive electrode and negative electrode (referred to hereinbelow as difference in potential) vary with time. In the present example, the initial micro-charging was performed for 10 sec and the cell was then allowed to stand for 30 sec. Then, the sequence of steps including micro-discharging for 2 sec, standing for 30 sec, micro-charging for 4 sec and standing for 30 sec was repeated ten times. The cell was then allowed to stand for about 30 min. During the micro-charging and micro-discharging, a pulsed current of 5 A was supplied by applying a pulsed voltage between the positive electrode and negative electrode. The maximum achieved potential of the positive electrode during the initial micro-charging was 4.5 V, the maximum achieved potential of the positive electrode during the second and subsequent micro-charging operations was about 3.8 V to about 4.1 V. In other words, the maximum achieved potential of the positive electrode was always equal to or higher than 3.2 V. The maximum achieved potential of the negative electrode during the micro-discharging was about 1.5 V to about 2.7 V, that is, equal to or lower than 3.2 V.

Figure 9:
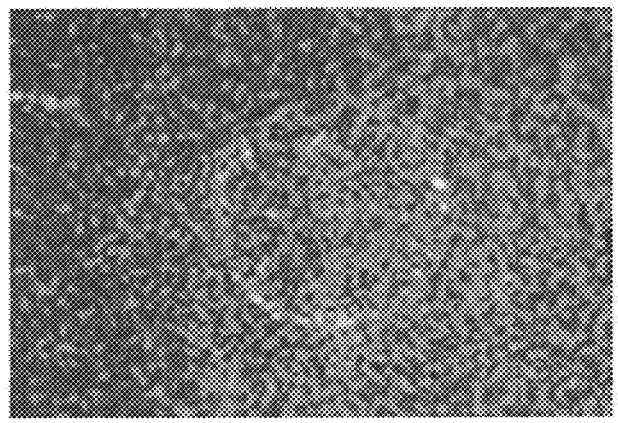
FIG. 9 is the image of a positive electrode surface in the example.
Figure 10:
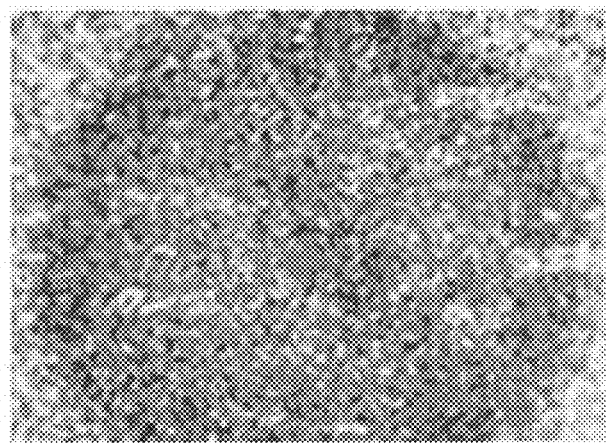
FIG. 10 is the image of a negative electrode surface in the example.
Figure 11:
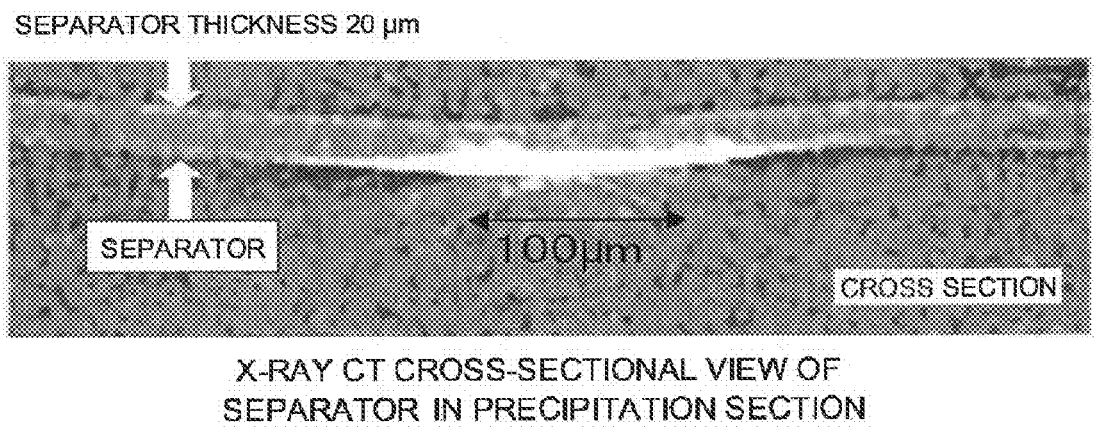
FIG. 11 is the X-ray CT image of a separator cross section in the example.

The cell was then disassembled and the surface of the positive electrode and negative electrode was observed under an optical microscope. An X-ray CT image of the separator cross section was also picked up. FIG. 9 is an observed image of the positive electrode surface, and FIG. 10 is an observed image of the negative electrode surface. FIG. 11 is the X-ray CT image of the separator cross section. As shown in FIG. 9, it was confirmed that the entire copper particle has dissolved on the positive electrode surface and no dissolution residue was left therein. As shown in FIG. 10, it was confirmed that copper has diffused to and precipitated on the negative electrode surface. FIG. 11 confirms that the growth of precipitates stopped in the intermediate section of the separator and the growth of precipitates such that could cause the short circuit was not observed.

The present invention is explained in detail hereinabove, but the above-described embodiments are merely exemplary, and the invention disclosed herein includes various changes and modifications of the above-mentioned specific examples.

REFERENCE SIGNS LIST 1 lithium ion secondary cell
10 positive electrode
11 positive electrode collector
12 positive electrode active material layer
15 cell case
20 negative electrode
21 negative electrode collector
22 negative electrode active material layer
30 separator

The invention claimed is:

1. A method for producing a lithium secondary cell provided with a positive electrode having a positive electrode active material made of a lithium-containing complex oxide, a negative electrode having a negative electrode active material capable of absorbing and releasing lithium ions, a separator interposed between the positive electrode and the negative electrode, and a nonaqueous electrolyte impregnated in the positive electrode, the negative electrode, and the separator, comprising:

assembling together the positive electrode, the separator, and the negative electrode, and then impregnating the assembly with the nonaqueous electrolyte;
preliminary charging the assembly within 1 min so that a maximum achieved potential of the positive electrode becomes 3.2 V or more with respect to the redox potential of lithium;
allowing the assembly to stand for 10 min or less after the preliminary charging has ended;
preliminary discharging the assembly within 1 min after the standing step; and
thereafter charging the assembly to a predetermined capacity.

2. The method for producing a lithium secondary cell according to claim 1, further comprising:
allowing the assembly to stand after the preliminary discharging has ended, wherein
the preliminary charging step, the standing step after the preliminary charging, the preliminary discharging step, and the standing step after the preliminary discharging are repeated one, two or more times before the assembly is charged to a predetermined capacity.

3. The method for producing a lithium secondary cell according to claim 2, wherein
the positive electrode active material is made of a lithium-containing complex oxide including at least manganese, cobalt, and nickel, and
the preliminary charging time is longer than the preliminary discharging time.

4. The method for producing a lithium secondary cell according to claim 2, wherein
the preliminary charging step, the standing step after the preliminary charging, the preliminary discharging step, and the standing step after the preliminary discharging are repeated ten or more times.

5. The method for producing a lithium secondary cell according to claim 1, wherein the assembly is allowed to stand for 5 min or less in the standing step after the preliminary charging.

6. The method for producing a lithium secondary cell according to claim 1, wherein an electric current equal to or higher than 1 C is supplied during the preliminary charging and/or preliminary discharging.

7. The method for producing a lithium secondary cell according to claim 1, wherein the preliminary charging is performed for 1 sec to 10 sec in the preliminary charging step.

8. The method for producing a lithium secondary cell according to 1, wherein the preliminary discharging is performed for 1 sec to 10 sec in the preliminary discharging step.

9. The method for producing a lithium secondary cell according to claim 1, wherein a maximum achieved potential of the negative electrode is set to be 3.2 V or less with respect to the redox potential of lithium in the preliminary discharging step.

10. The method for producing a lithium secondary cell according to claim 1, further comprising:
allowing the assembly to stand for 30 min or more after all of the preliminary charging step, the standing step after the preliminary charging, and the preliminary discharging step, have ended; and
charging the assembly in excess of 1 min.

* * * * *